C. D. LUCE.
LEVEL.
APPLICATION FILED AUG. 3, 1921.
1,433,513.
Patented Oct. 24, 1922.
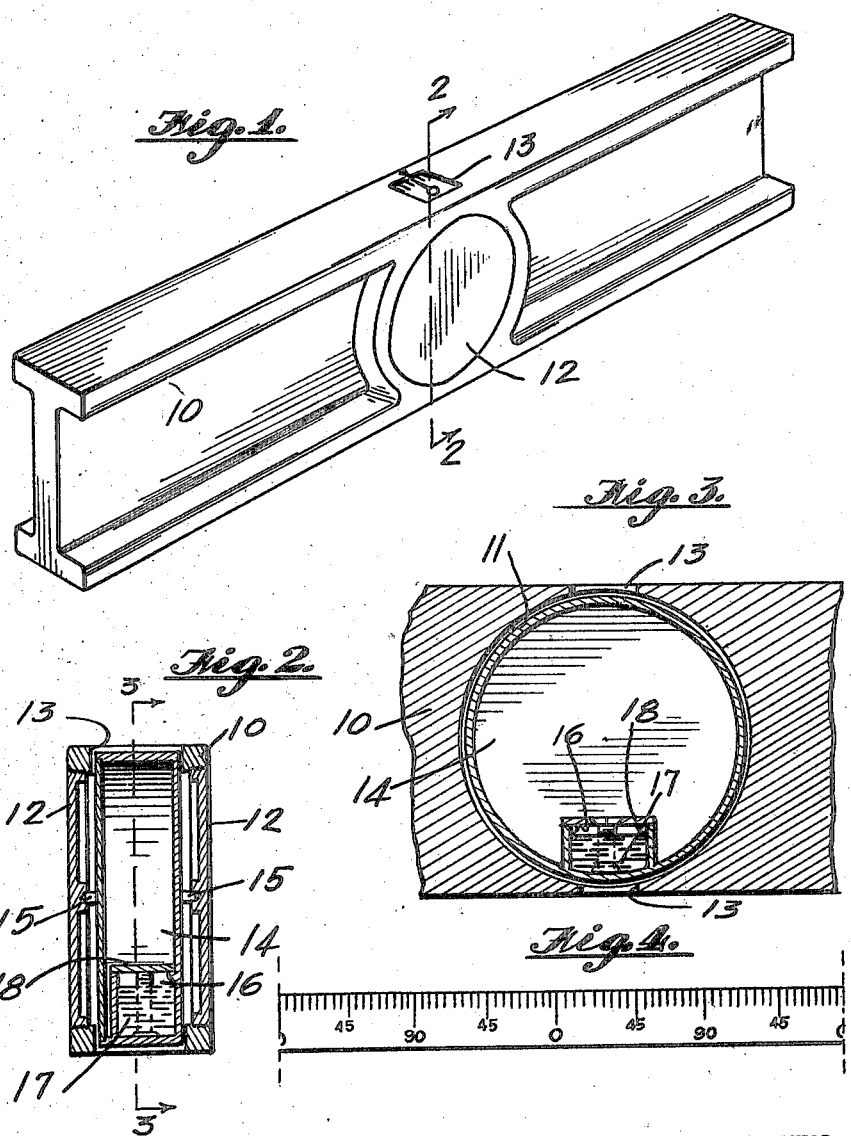
INVENTOR.
Charles D. Luce.
BY
Hazard & Miller
ATTORNEYS.

Patented Oct. 24, 1922.

1,433,513

UNITED STATES PATENT OFFICE.

CHARLES D. LUCE, OF ANAHEIM, CALIFORNIA.

LEVEL.

Application filed August 3, 1921. Serial No. 489,467.

*To all whom it may concern:*

Be it known that I, CHARLES D. LUCE, a citizen of the United States, residing at Anaheim, in the county of Orange and State of California, have invented new and useful Improvements in Levels, of which the following is a specification.

My invention relates to improvements in levels, the principal objects of my invention being to generally improve upon and simplify the construction of the existing types of levels, to provide a construction wherein the movable element of the level is in the form of a gravity actuated disc, and which latter bears on its periphery a graduated scale thereby providing means whereby the angular position of the level may be readily observed and accurately read.

With the foregoing and other objects in view, my invention consists in certain novel features of construction and arrangement of parts that will be hereinafter more fully described and claimed and illustrated in the accompanying drawings, in which:

Figure 1 is a perspective view of a level of my improved construction.

Fig. 2 is a cross section taken on the line 2—2 of Fig. 1.

Fig. 3 is a sectional view taken approximately on the line 3—3 of Fig. 2.

Fig. 4 is a view graphically illustrating the periphery of the gravity actuated member of the level, and showing the graduated scale thereupon.

Referring by numerals to the accompanying drawings which illustrate a practical embodiment of my invention, 10 designates the body of the level which may be of any desired size and construction, and formed at or near the center thereof is a cylindrical opening 11, the ends of which are closed by readily removable discs or plates 12. The diameter of the opening 11 is such that its periphery lies immediately adjacent to the top and bottom surfaces of the body of the level, and formed through said body and communicating with the opening 12 at diametrically opposite points thereupon are relatively small apertures 13 which perform the functions of windows or sight openings through which may be observed the graduations on the periphery of the gravity actuated member of the level.

This gravity actuated member comprises a hollow disc 14, the side walls of which are provided with axially disposed trunnions 15, and which latter are journaled in suitable bearings on the inner faces of the central portions of discs 12. Formed within the hollow disc 14 and adjacent to the annular wall thereof is a pocket 16 that contains a body 17 of mercury or the like, and the top of which pocket is normally closed by a removable plate 18. The periphery of the annular wall of the hollow disc 14 is provided with a scale, the graduations of which are arranged to indicate the degrees of a circle.

An oppositely disposed pair of the graduations of this scale are provided with zero marks, and which latter are arranged so that they occupy central positions within the openings 13 when the body of the level occupies a true horizontal position. The marks of the scale at points midway between these zero points are provided with the designating numerals 90, and the markes of the scale that are midway between the zero and 90° marks are provided with the designating numerals 45. The marking of the graduated scale is clearly illustrated in Fig. 4, and the mercury pocket within the hollow disc is arranged so that when the level body occupies a horizontal position, the zero marks of the scale are centrally arranged within the openings 13.

Obviously, as the scale is shifted into an angular position, the disc 14 will rotate upon its bearings, and by noting the marks of the graduated scale through the openings 13, the angular position of the body of the scale may be readily ascertained and the reading will be in degrees of a circle.

A level of my improved construction may be easily and cheaply produced, is quickly responsive to changes in position of the level body, and as the readings on the graduated scale forming a part of the level are in degrees, the device has decided advantages over the ordinary forms of spirit levels, or those levels utilizing a glass tube containing a body of liquid.

The construction employed in my improved level may be utilized to advantage as a grade indicator for locomotives, electric cars, motor vehicles, and the like, and also for indicating the vertical angle of flight of aeroplanes, airships, and the like.

It will be understood that minor changes in size, form and construction of the various parts of my improved level may be made and substituted for those herein shown and described without departing from the spirit of my invention, the scope of which is set forth in the appended claim.

I claim as my invention:

A level comprising a beam-like body having a pocket therein and openings communicating with the pocket, removable plates closing the sides of said pocket, a hollow disk within the pocket and including a removable side portion, a mercury containing pocket formed in the disk and including a removable cover plate, trunnions on the sides of the disk, and bearings formed in the confronting sides of the first plates and receiving said trunnions.

In testimony whereof I have signed my name to this specification.

C. D. LUCE.